Sept. 9, 1958     B. R. NICHOLS     2,851,046
CONTROL SYSTEM FOR HYDRAULIC TURBINES INCLUDING
A GOVERNOR HYDRAULICALLY CONNECTED TO MEANS
CONTROLLING OPERATION OF TURBINE
INLET VALVE MEANS Filed Oct. 21, 1955     3 Sheets-Sheet 2

Inventor
Beverly R. Nichols
By Arthur M. Strich
Attorney

United States Patent Office 2,851,046
Patented Sept. 9, 1958

2,851,046

CONTROL SYSTEM FOR HYDRAULIC TURBINES INCLUDING A GOVERNOR HYDRAULICALLY CONNECTED TO MEANS CONTROLLING OPERATION OF TURBINE INLET VALVE MEANS

Beverly R. Nichols, Wauwatosa, Wis., assignor to Allis-Chalmers Manufacturing Company, Milwaukee, Wis.

Application October 21, 1955, Serial No. 541,906

9 Claims. (Cl. 137—26)

This invention relates to hydraulic turbines supplying power to variable load and in particular this invention relates to control systems for operating hydraulic turbines at a substantially constant predetermined speed for variable loads.

It is desired by hydroelectric companies that hydraulic turbo-generator units, supplying alternating current to a complex electrical network, be controlled to operate within 0.01% of the predetermined frequency of the alternating current produced by the generator. This means that in a 60 cycle system it is desired that the governor be able to sense and start a corrective change in turbine speed resulting in a change in generated current frequency of 0.006 cycle. Although some governors and governing systems having for relatively short periods performed with this degree of accuracy, prior to the present invention none were known to continuously and reliably perform with this desired sensitivity. It is, therefore, a principal object of this invention to provide a new and improved control system for hydraulic turbines that will be more sensitive and more reliable than any previously known to those skilled in the art.

According to the present invention means are provided for controlling the flow of water to a hydraulic turbine which in the case of a reaction turbine may be wicket gates. A fluid operative servomotor is provided to move the wicket gates in opening and closing directions. The flow of operating fluid to the servomotor is controlled by a servomotor control valve which is operated by a hydraulic motor comprising a differential piston within a cylinder. Fluid pressure for moving the differential piston is admitted to the cylinder under the control of a governor that is responsive to changes in turbine speed. The governor includes flyballs which are connected to a sleeve that rotates with the flyballs and the sleeve is moved along its axis of rotation by changes in turbine speed which cause the flyballs to move closer together or farther apart. The sleeve is fitted within a housing having fluid inlet and outlet ports. The sleeve also has ports for admitting fluid pressure to the space within the sleeve and the sleeve also has ports for communicating with the housing outlet port. The ports in the sleeve are moved relative to the housing inlet and outlet ports by the flyballs to line up the ports in the sleeve with the ports in the housing and thereby communicate fluid pressure from a source through the governor to the differential piston that operates the gate servomotor control valve. Another object of the present invention is to provide an improved control system for hydraulic turbines in which a governor responsive to variations in turbine speed is hydraulically connected to turbine gate operating means to provide more sensitive and more reliable control of turbine speed than heretofore known to this art.

Prior to the present invention it has been the practice to connect flyballs or a flyball governor to a control valve for a hydraulic turbine gate operating servomotor, by a mechanical linkage. Two embodiments of this practice are illustrated in U. S. Patent 2,067,460 and 2,265,929, respectively. With a mechanical linkage, means comprising a finger movable to engage a collar attached to the control valve linkage, may be provided to limit the amount the servomotor can move the turbine gates. Patent 2,265,929 shows an arrangement whereby turbine gate opening can be limited and Patent 2,067,460 shows an arrangement whereby both closing and opening action of turbine gates can be limited. According to the present invention, however, the control valve is operated by a differential piston hydraulically connected to the flyball governor. A mechanism of the type shown in U. S. Patents 2,067,460 and 2,265,929 which have a finger that engages a linkage cannot, therefore, be used with the present system in which a hydraulic connection is provided between the flyball governor inlet and outlet ports and the servomotor control valve. It is, therefore, another object of this invention to provide new and improved means for limiting the amount a gate operating servomotor can move turbine gates.

Other objects and advantages will appear from the following description of embodiment of the invention, reference being made to the accompanying drawings, in which.

Figure 1:
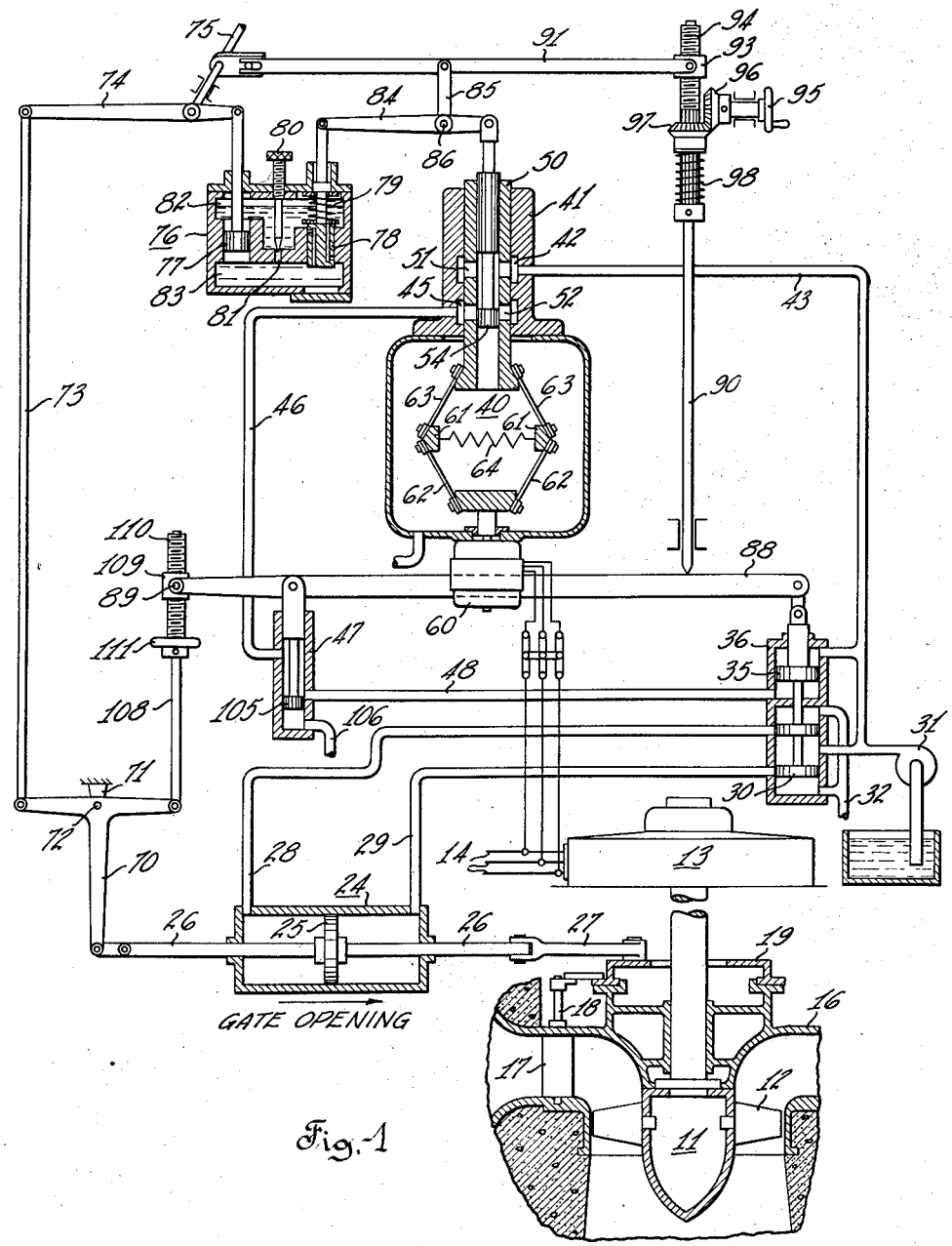
Fig. 1 is a diagrammatic illustration of a hydraulic turbine installation and control system embodying the present invention with portions of the illustrated apparatus shown partly in section to more clearly illustrate the various parts.

Referring to Fig. 1 of the drawings, the improved control system is herein shown as being applied to a hydraulic turbine 11 which in this illustration has a propeller type rotor 12. The turbine 11 drives an alternating current generator 13 connected to a system of distribution 14. The turbine 11 comprises the usual spiral casing 16 which is connected to a source of water pressure (not shown) and which forms a peripheral inlet chamber for the turbine. Inlet valve means are provided for controlling the flow of water to the turbine and in an embodiment such as illustrated in Fig. 1, in which the turbine is of the propeller type, the valve means may be a series of movable gates 17 mounted in the turbine casing. Each of the gates 17 is provided with a stem 18 journaled at the top and bottom in casing 16. The upper portion of this stem 18 may extend through casing 16 sufficiently to provide for a conventional linkage with a shifting ring 19. Ring 19 may be rotated to adjust the position of wicket gates 17 and thereby control water flow to turbine 11. At least one fluid pressure operated servomotor 24 is provided to move ring 19 and gates 17. Servomotor 24 has a fluid operated piston 25 which is secured to a rod 26 which is in turn connected on one end to shifting ring 19 by a link 27. Operating pressure is supplied servomotor 24 through pipes 28, 29. Pipes 28, 29 are selectively connected to a source of fluid pressure 31 or a drain 32 by a control valve 30. A fluid pressure operated differential piston 35, mounted within a cylinder 36, is connected to control valve 30 to operate the control valve. Cylinder 36 is hydraulically connected to the pressure source, at a point above differential piston 35.

A speed governor assembly 40 is provided comprising a cylindrical housing 41 having an annular inlet port 42 connected to the source of fluid pressure 31 through a pipe 43. The cylindrical housing 41 is also provided with an annular outlet port 45 hydraulically connected to cylinder 36, at a point beneath the differential piston 35, through a pipe 46, a cylinder 47, and a pipe 48. A cylindrical sleeve 50 is fitted within the bore of cylindrical housing 41. The sleeve 50 is rotated within housing 41 in a manner and for a purpose that will appear. Two groups of ports 51 and 52 in sleeve 50 hydraulically connect inlet port 42 to outlet port 45 through the bore of sleeve 50. A pilot valve element 54 is fitted within the bore of sleeve 50 and is axially movable relative to the rotating sleeve 50 in a manner hereinafter described, to control the flow of fluid from pipe 43, through inlet port 42, through the ports 51 in sleeve 50 and then through the bore of sleeve 50 to the ports 52 and out through port 45 into the outlet pipe 46. Since the sleeve 50 is always rotating relative to the housing 41 and valve element 54, friction between these parts is very low. Because of this low friction, the position of sleeve 50 can be very precisely adjusted and very fine and accurate control can be maintained over the flow of pressure fluid through the governor housing 41.

Included in the speed governor assembly 40 are the means for rotating the sleeve 50 and for moving the sleeve 50 relative to the housing 41 and the element 54 to vary the flow of pressure fluid passing from the pipe 43 to the pipe 46. An electric motor 60 operates from and in synchronism with the distribution line 14 at a speed equal to or proportional to the speed of turbine 11. A pair of flyballs 61 are connected to motor 60 by springs 62. Flyballs 61 are connected to sleeve 50 by springs 63. The flyballs 61 are connected together and biased inwardly toward each other by a spring 64.

As much of the control system as has thus far been described operates in the following described manner. When the speed of turbine 11 increases above the predetermined desired speed, the speed of motor 60 will also increase and centrifugal force acting upon the flyballs 61 will be increased and the flyballs will move farther apart and pull sleeve 50 downwardly. As the rotating sleeve 50 moves downwardly relative to the housing 41 and pilot valve element 54 fluid communication from pipe 43 and the bore of sleeve 50 through outlet port 45 will be cut off. Fluid pressure will drain from pipe 46 through ports 45, 52 and then through the portion of the bore of sleeve 50 that is beneath the pilot valve element 54. Reducing the pressure in pipe 46 will cause a corresponding reduction in pressure in pipe 48 and in cylinder 36 beneath differential piston 35. With reduced pressure beneath piston 35 fluid pressure acting on the top surface of this piston will move the piston downwardly and also move control valve 30 downwardly. Downward movement of control valve 30 will result in opening pipe 29 to fluid pressure from the source 31 and opening pipe 28 to drain 32. Fluid pressure from pipe 29 will enter servomotor 24 and move piston 25 and move turbine gates 17 in a closing direction. As the piston 25 moves in a gate closing direction the speed of turbine 11 will be reduced.

If on the other hand instead of the speed of turbine 11 being above predetermined value, the speed of turbine 11 is now considered to be below the predetermined desired speed, the speed of motor 60 will then be proportionately reduced. When motor 60 slows down centrifugal force acting upon flyballs 61 is reduced and spring 64 will bias the flyballs inwardly toward each other and move the sleeve 50 upwardly. Upward movement of the sleeve 50 relative to the housing 41 and pilot valve element 54 will increase fluid pressure communicated from the bore of sleeve 50 through ports 52 and outlet port 45 into pipe 46. Increasing the flow of pressure fluid into pipe 46 will increase the pressure in pipe 48 and cylinder 36 beneath differential piston 35. With equal pressure beneath and above piston 35, the piston will move upwardly because of the greater area exposed to the pressure on the underside of the piston. As the piston 35 moves upwardly pipe 28 will be opened to pressure from source 31 and pipe 29 will be opened to drain 32. Pressure will thereby be admitted to servomotor 24 on the left side of piston 25 and released from the right side of piston 25 and the servomotor will move the gates 17 in an opening direction. As the gates 17 move in an opening direction more water will be admitted to the turbine 11 and turbine speed will be increased to the predetermined desired turbine speed.

In order to stop movement of servomotor 24 and the gates 17 after movement thereof has been initialed it is necessary that control valve 30 be restored to a neutral position. Adjustable relay means are provided to relay movement of servomotor 24 and differential piston 35 back to pilot valve element 54 to position the pilot valve element relative to the ports 51 and 52 in sleeve 50 so as to adjust the flow of pressure fluid to the space beneath piston 35 and cause piston 35 to move control valve 30 back to a neutral position in which both pipes 28 and 29 are closed. Movement of piston 25 within servomotor 24 is relayed back to the governor 40 by a linkage that includes a trifurcate crank 70 supported by a bracket 71 for rotation about an axis 72. One arm of crank 70 is connected to the rod 26 of servomotor 24. Another arm of crank 70 is connected to a rod 73. Rod 73 is in turn connected to a lever 74 which is rotatable about a rod 75 connected to lever 74 at a point intermediate its end portions. The end of lever 74 remote from rod 73 is connected to a fluid filled dashpot assembly 76. The dashpot assembly 76 includes a pair of pistons 77 and 78. Piston 77 is connected to the end of lever 74. A spring 79 is provided to return piston 78 to a midposition in the dashpot assembly after piston 78 has been moved either upwardly or downwardly by a change in pressure beneath the piston. Piston 78 is connected to a lever 84 which is supported at a point intermediate its end portions by a link 85 for rotation about an axis 86. The end of lever 84 remote from piston 78 is connected to pilot valve element 54. A needle valve 80 controls flow of hydraulic fluid through a port 81 between two chambers 82 and 83 within dashpot assembly 76. Chamber 82 is above pistons 77 and 78 and chamber 83 is beneath the two pistons.

The operation of the means for relaying action of servomotor 24 back to pilot element 54 is as follows. As shown, gate opening action of servomotor 24 will rotate crank 70 counterclockwise around axis 72 and lower rod 73. Downward movement of rod 73 will turn lever 74 counterclockwise around rod 75 and lift piston 77. Upward movement of piston 77 will reduce to a negative value the pressure on the fluid in chamber 83 and piston 78 will be urged downwardly by the negative pressure beneath piston 78. This will rotate lever 84 counterclockwise around axis 86 and lift pilot valve element 54 relative to ports 52 in sleeve 50. And vice versa, gate closing action of servomotor 24 will rotate crank 70 clockwise around axis 72 and raise rod 73. This will turn lever 74 clockwise and piston 77 will be pushed down thereby tending to increase the fluid pressure in chamber 83. If the downward movement of piston 77 increases the pressure in chamber 83 faster than the pressure is relieved through port 81 under the control of needle valve 80 then piston 78 will move upwardly against the bias of spring 79. Upward movement of piston 78 will turn lever 84 clockwise about axis 86 and push pilot valve element 54 down relative to the ports 52 in sleeve 50.

To insure that pilot valve 30 is restored to a neutral position in the manner indicated above, movement of the differential piston 35 that operates valve 30 is also relayed back to the pilot valve element 54 of governor 40. Means for relaying this movement back to the governor include a lever 88 connected on one end to piston 35 and on the other end for rotation about a selectively positioned point 89. A rod 90 is carried by lever 88 at a point intermediate the end portions of lever 88. Rod 90 is adjustably connected to one end of a lever 91. Link 84 is connected to lever 91 intermediate the end portions thereof. The adjustable connection between rod 90 and lever 91 includes a collar 93 connected to lever 91. Collar 93 is internally threaded to engage external threads on a sleeve 94 fitted on the end of rod 90. A hand wheel 95 rotatable about an axis fixed in space is connected to a spur gear 96. An annular gear 97 is fitted about rod 90 and splined thereto to be movable relative to rod 90 in an axial direction only. A spring 98 urges gear 97 into continuous engagement with gear 96. Rotation of hand wheel 95, gears 96, 97 and rod 90 will cause collar 93 to move upwardly or downwardly along the threaded portion 94 of rod 90 and thereby provide means for adjusting the linkage from differential piston 35 to the pilot valve element 54.

It is at times desirable to limit the power output of the generator 13 or to operate the turbine 11 with the gates 17 controlled so that movement thereof beyond a predetermined amount is made impossible. The means herein provided for limiting the power output of turbine 11 and generator 13 include fluid flow throttling means herein shown as the throttle valve element 105 within cylinder 47 operative to throttle the flow of fluid pressure from pipe 46 into pipe 48 and the space beneath piston 35. Throttle valve 105 is selectively responsive to predetermined gate adjusting action of servomotor 24 by means of an adjustable linkage connecting the throttle valve to servomotor 24. The adjustable linkage may include as shown the lever 88 connected on the end remote from piston 35 to a rod 108 which is in turn connected to crank 70. Lever 88 is connected to throttle valve 105 at a point between its end portions. The end of lever 88 connected to rod 108 is adjustably connected thereto by means of a collar 109 internally threaded to engage an externally threaded sleeve 110 fitted over the end of rod 108. The externally threaded sleeve 110 is rotatable relative to the rod 108 and may be turned by turning a hand wheel 111 connected thereto. Turning hand wheel 111 raises or lowers the collar 109 and adjusts the leverage between rod 108 and lever 88. When servomotor 24 operates to move the turbine gates 17 in a gate opening direction rod 26 is moved to the right. The crank 70 is then rotated counterclockwise about the bracket 71 and rod 108 is raised. Upward movement of rod 108 also raises throttle valve 105 to throttle flow of pressure fluid into pipe 48 and open pipe 48 to a drain 106. Control valve 30 will therefore move downwardly to a neutral position in which no further gate opening action can be taken by servomotor 24. The position to which the gates 17 are permitted to move in an opening direction before further movement of servomotor 24 is throttled depends on the adjustment of the connection between the rod 108 and the lever 88 as determined by the setting of hand wheel 111.

In addition to functioning to limit gate opening movement of servomotor 24, the load limit throttle valve 105 also functions to stop movement of servomotor 24 in either direction when servomotor 24 has moved gates 17 to a new position as a result of a change in the setting of hand wheel 111. If turbine 11 is operating with gates 17 opened to the maximum permitted by the setting of the load limit hand wheel 111 and it is desired to adjust the load limit means so as to cause gates 17 to move in a closing direction, hand wheel 111 is turned to raise collar 109. Throttle valve 105 will then also be raised shutting off the flow of pressure fluid from pipe 46 to pipe 48 and opening pipe 48 to drain 106. Piston 35 and valve 30 will then move downwardly opening pipe 29 to pressure from the source 31 and opening pipe 28 to drain 32. Servomotor 24 will then move gates 17 in a closing direction. The downward movement of piston 35 resulting from upward movement of throttle valve 105 and the downward movement of rod 108 resulting from subsequent gate closing motion of servomotor 24, both act to lower throttle valve 105 back to a position which will cause piston 35 and valve 30 to return to a neutral position and stop gate closing movement of servomotor 24 at a position corresponding to the new setting of hand wheel 111. And vice versa if hand wheel 111 is turned to lower collar 109, to lower throttle valve 105 and cause gates 17 to move in an opening direction, the resulting upward movement of piston 35 and upward movement of rod 108, will reverse the action of valve 105 so that gate opening movement of servomotor 24 will be stopped at the position corresponding to the new position of hand wheel 111.

Figure 2:
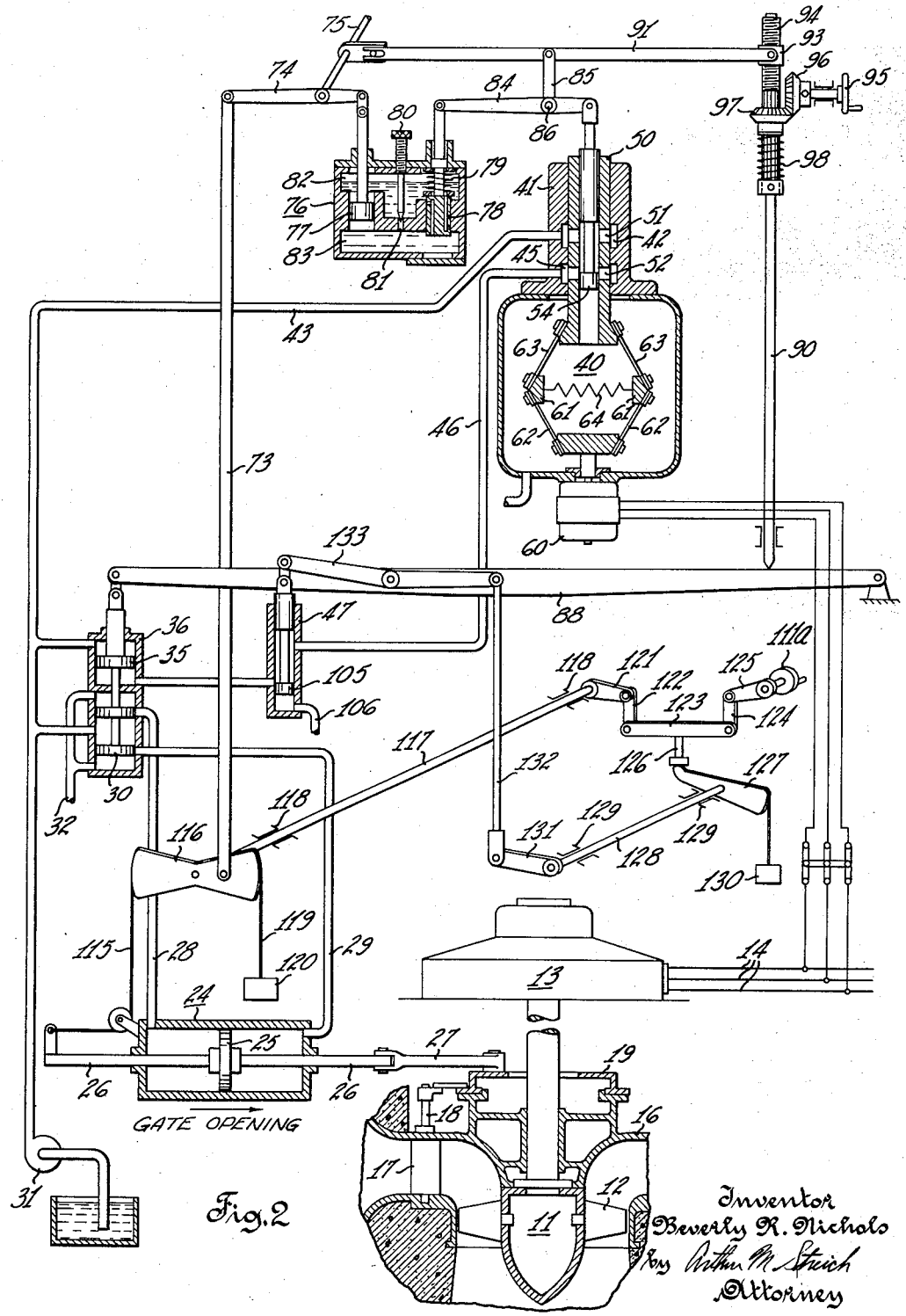
Fig. 2 is a diagrammatic illustration of another embodiment of the invention.

In the embodiment thus far described the means for limiting action of the servomotor 24 is adjusted by turning hand wheel 111 and the setting of the limiting means is indicated by the position of the collar 109 along the axis of the sleeve 110. It may at times be desirable to provide an arrangement in which the adjusting means and the position indicating means are both on a remotely located control board. Fig. 2 of the drawings shows an embodiment of the present invention having an adjusting wheel 111a, which may be manually operated on a remote control panel or operated electrically from a remote control panel. Wheel 111a adjusts a linkage connected to throttle valve 105 and servomotor 24. The linkage connecting servomotor 24 to throttle valve 105 may include as shown in Fig. 2 a cable 115 connected on one end to rod 26 and connected on its other end to a lever 116. Lever 116 is secured to one end of a rod 117 which is journaled in bearings 118. A second cable 119 is connected to the lever 116 on the opposite side of the axle 117 from the cable 115. A weight 120 is attached to the free end of cable 119 and biases lever 116 and axle 117 for clockwise rotation. An arm 121 is secured to the end of axle 117 remote from lever 116. Arm 121 is connected to a link 122 which is in turn connected to a lever 123. The end of lever 123 remote from link 122 is connected to a link 124. The link 124 is connected to the hand wheel 111a by an arm 125. A push rod 126 projects from lever 123 into an engaging relationship with an arm 127 secured to a rod 128. The rod 128 is journaled in bearings 129. Contact between the arm 127 and push rod 126 may be maintained as shown by a counterbalancing weight 130. The end of rod 128 remote from arm 127 is connected to an arm 131. The arm 131 is in turn connected to a rod 132. The rod 132 is connected to a throttle valve actuating lever 133. In this embodiment lever 88 comprises a first lever, and lever 133, a second lever. Lever 133 is the throttle valve actuating lever. Said second lever 133 is pivotally connected to said first lever 88.

In this embodiment of the invention movement of servomotor 24 to open turbine gates 17 causes rod 117 and arm 121 to rotate and push down on link 122. Downward movement of link 122 will rotate lever 123 about link 124 and push down on push rod 126. Downward movement of push rod 126 will rotate arm 127, rod 128 and arm 131 so as to lower rod 132. Downward movement of rod 132 will rotate the throttle valve actuating arm 133 relative to lever 88 so as to lift throttle valve 105 within cylinder 47 and throttle further gate opening movement of servomotor 24. With the throttle valve actuating lever 133 pivotally connected to the lever 88 as shown in Fig. 2, upward movement of the differential piston will also cause throttle valve 105 to be lifted. Thus both the action of the governor as reflected by movement of piston 35, and the movement of servomotor 24 are relayed to the throttle valve 105 to operate the throttle valve to limit opening of gates 17 and thereby limit the load taken on by the turbine.

To adjust the load limit arrangement shown in Fig. 2 so as to reduce the maximum amount of water permitted to flow through turbine 11, hand wheel 111a is rotated so as to turn arm 125 to push down on link 124 and rotate lever 123 about its connection with the link 122 so as to lower rod 132. Downward movement of rod 132 will rotate the throttle valve actuating arm 133 relative to its supporting lever 88 to raise the throttle valve 105 in cylinder 47 thereby decreasing the amount of upward movement of piston 35 and decreasing the amount of movement of servomotor 24 in a gate opening direction, required to actuate the throttle valve 105 to stop further opening of the gate 17.

In a likewise manner, the maximum amount of water permitted to flow through turbine 11 may be increased by turning hand wheel 111a so as to lift push rod 126 and cause throttle valve 105 to move downwardly relative to the lever 88. Thus a greater gate opening movement of servomotor 24 is required before throttle valve 105 is lifted sufficiently to throttle the flow of fluid into pipe 48.

Like the embodiment shown in Fig. 1, the position of gates 17 in the embodiment of Fig. 2, may be changed by turning hand wheel 111a to operate valve 105. And when the gates 17 move as a result of turning hand wheel 111a to a new position, their movement is stopped at the new position by the action of piston 35 and servomotor 24 which is relayed back to lever 88 to restore valve 105 to a position that will stop gate adjusting movement of servomotor 24.

Figure 3:
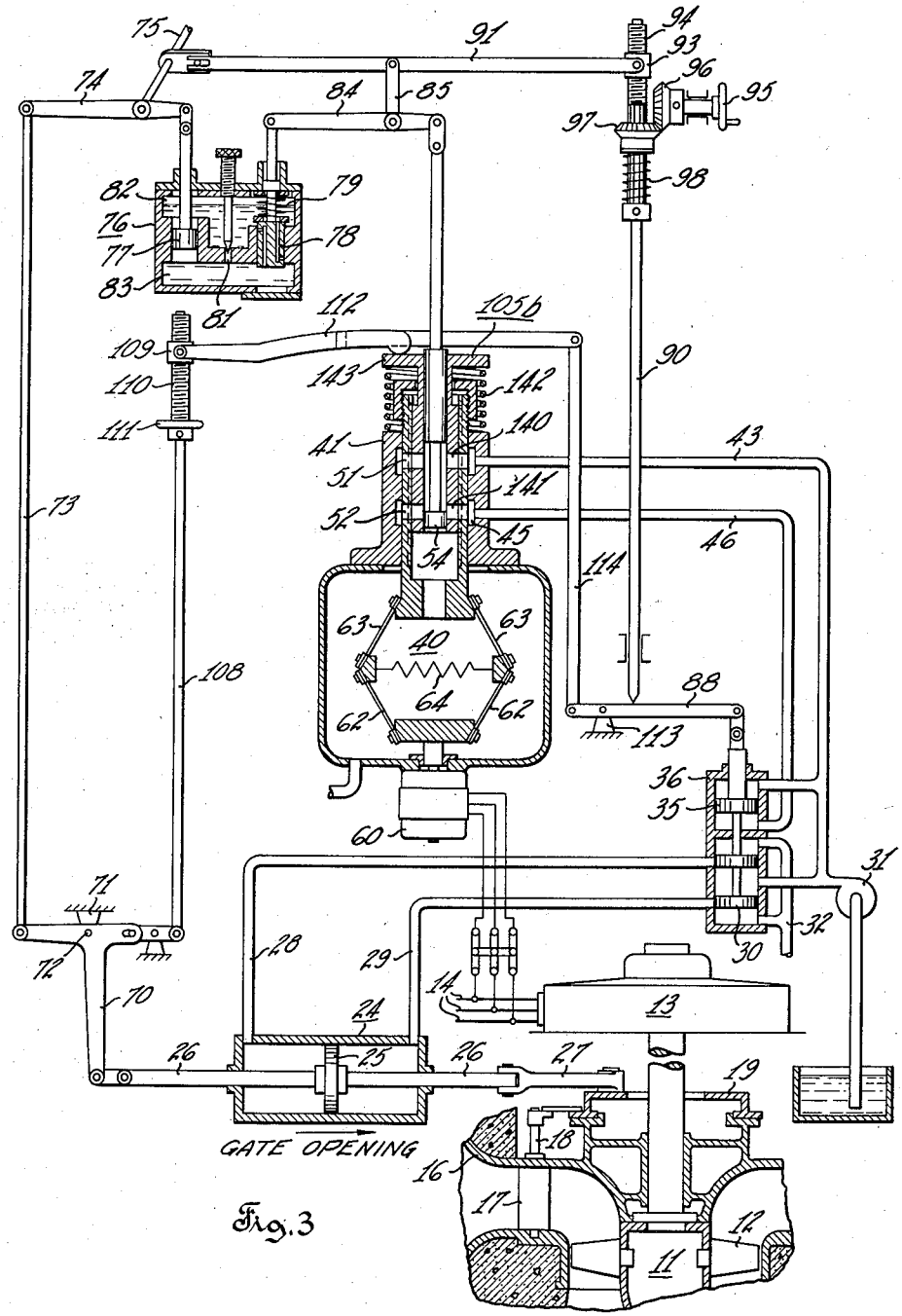
Fig. 3 is a diagrammatic illustration of still another embodiment of the invention.

Referring now to Fig. 3, an embodiment of the present invention is shown which is similar to the arrangement shown in Fig. 1 except that a throttle valve 105b provided for limiting gate opening action of servomotor 24 initiated by an increase in load and for stopping action of servomotor 24 initiated by a change in the setting of gate limiting means, is made a part of the governor assembly 40 rather than placing the throttle valve within a separate housing such as the cylinder 47 shown in Figs. 1 and 2. In the embodiment shown in Fig. 3 the throttle valve 105b is of cylindrical shape and this member is positioned between the sleeve 50 and the pilot valve element 54 of the governor assembly. Throttle valve element 105b is provided with two groups of ports 140 and 141 similar to the ports 51 and 52 in the sleeve 50. The throttle valve 105b is splined to the sleeve 50 to rotate therewith and be axially movable relative thereto. The cylindrical throttle valve 105b is positioned axially relative to the sleeve 50 by a coil spring 142 placed between a collar 143 of cylinder 105b and the top of governor housing 41. A lever 112 is movable to engage the top of valve 105b and push downwardly thereon and compress spring 142. Downward movement of valve 105b, caused by gate opening motion of servomotor 24 approaching a point determined by the setting of hand wheel 111, stops further gate opening action of servomotor 24 by throttling the flow of pressure fluid through pipe 43 and opening pipe 46 to drain through ports 45, 52, 141 and then downwardly through the bore in the sleeve 50. When hand wheel 111 is turned to lower collar 109 and cause lever 112 to push valve 105b downwardly to cause servomotor 24 to move gates 17 in a closing direction, a restoring linkage connecting piston 35 to lever 112 causes lever 112 to back off and away from engagement with valve 105b, and spring 142 then returns valve 105b to a position that will stop gate closing action of servomotor 24. As shown in Fig. 3 this linkage may include a lever 88 pivotal about a fulcrum 113 and connected at one end to piston 35 and connected on the other end to a rod 114 that in turn is connected to the lever 112.

From the foregoing it will be apparent to those skilled in the art that the illustrated embodiments of the invention provide new and improved control means for hydraulic turbines and accordingly accomplishes the objects of the invention. On the other hand, it will be obvious to those skilled in the art that the illustrated embodiments of the invention may be variously changed and modified or features thereof singly or collectively embodied in other combinations than those illustrated without departing from the spirit of the invention. Accordingly, the disclosed embodiments are illustrative only and the invention is not limited thereto.

It is claimed and desired to secure by Letters Patent:

1. In combination with a hydraulic turbine supplying power to a variable load at substantially constant predetermined speed, inlet valve means for controlling flow of water to said turbine, a fluid pressure operated servomotor movable to operate said turbine inlet valve means, a control valve for controlling admission of fluid pressure to said servomotor, a cylinder, a fluid pressure operated differential piston within said cylinder, said differential piston dividing said cylinder into two sections, said piston being connected to said control valve to operate said control valve, a source of fluid under pressure, one section of said cylinder connected to said source of fluid, a governor comprising a cylindrical housing having an inlet port connected to said source of fluid and having an outlet port connected to the other section of said cylinder, a cylindrical sleeve having an outer surface engaging an inner surface of said housing, said sleeve having at least a pair of openings for hydraulically connecting said inlet port to said outlet port through the bore of said sleeve, a pilot valve element within said sleeve, and means connected to said sleeve responsive to rotation of said turbine to rotate said sleeve about said pilot valve element and to move said sleeve axially relative to said housing and said pilot valve element to vary the flow of pressure fluid passing from said inlet port to said outlet port through said pair of openings and the bore of said sleeve under the control of said pilot valve element in response to turbine speed greater than and less than said predetermined speed to vary fluid pressure flow to said differential piston to move said differential piston and said control valve to admit fluid pressure to said servomotor to adjust said turbine inlet valve means to restore turbine speed to said predetermined speed, and said pilot valve element being connected to said servomotor and said differential piston to relay the movement of said servomotor and said differential piston back to said pilot valve element to move said pilot valve element relative to said sleeve to vary fluid pressure flow through said housing and said sleeve to move said differential piston and said control valve to a neutral position when said turbine resumes operation at approximately said predetermined speed.

2. In combination with a hydraulic turbine supplying power to a variable load at substantially constant predetermined speed, inlet valve means for controlling flow of water to said turbine, a fluid pressure operated servomotor movable to operate said turbine inlet valve means, a control valve for controlling admission of fluid pressure to said servomotor, a cylinder, a fluid pressure operated differential piston within said cylinder, said differential piston dividing said cylinder into two sections, said piston being connected to said control valve to operate said control valve, a source of fluid under pressure, one section of said cylinder connected to said source of fluid, a governor comprising a cylindrical housing having an inlet port connected to said source of fluid and having an outlet port connected to the other section of said cylinder, a cylindrical sleeve having an outer surface engaging an inner surface of said housing, said sleeve having at least a pair of openings for hydraulically connecting said inlet port to said outlet port through the bore of said sleeve, a pilot valve element within said sleeve, and means connected to said sleeve responsive to rotation of said turbine to rotate said sleeve about said pilot valve element and to move said sleeve axially relative to said housing and said pilot valve element to vary the flow of pressure fluid passing from said inlet port to said outlet port through said pair of openings and the bore of said sleeve under the control of said pilot valve element in response to turbine speed greater than and less than said predetermined speed to vary fluid pressure flow to said differential piston to move said differential piston and said control valve to admit fluid pressure to said servomotor to adjust said turbine inlet valve means to restore turbine speed to said predetermined speed, and said pilot valve element being connected to said servomotor and said differential piston to relay the movement of said servomotor and said differential piston back to said pilot valve element to move said pilot valve element relative to said sleeve to vary fluid pressure flow through said housing and said sleeve to move said differential piston and said control valve to a neutral position when said turbine resumes operation at approximately said predetermined speed, and adjustable means responsive to predetermined turbine inlet valve adjusting action of said servomotor for limiting adjusting action of said servomotor to a predetermined range of openings of said turbine inlet valve means.

3. In combination with a hydraulic turbine supplying power to a variable load at substantially constant predetermined speed, inlet valve means for controlling flow of water to said turbine, a fluid pressure operated servomotor movable to operate said turbine inlet valve means, a control valve for controlling admission of fluid pressure to said servomotor, a cylinder, a fluid pressure operated differential piston within said cylinder, said differential piston dividing said cylinder into two sections, said piston being connected to said control valve to operate said control valve, a source of fluid under pressure, one section of said cylinder connected to said source of fluid, a governor comprising a cylindrical housing having an inlet port connected to said source of fluid and having an outlet port connected to the other section of said cylinder, a cylindrical sleeve having an outer surface engaging an inner surface of said housing, said sleeve having at least a pair of openings for hydraulically connecting said inlet port to said outlet port through the bore of said sleeve, a pilot valve element within said sleeve, and means connected to said sleeve responsive to rotation of said turbine to rotate said sleeve about said pilot valve element and to move said sleeve axially relative to said housing and said pilot valve element to vary the flow of pressure fluid passing from said inlet port to said outlet port through said pair of openings and the bore of said sleeve under the control of said pilot valve element in response to turbine speed greater than and less than said predetermined speed to vary fluid pressure flow to said differention piston to move said differential piston and said control valve to admit fluid pressure to said servomotor to adjust said turbine inlet valve means to restore turbine speed to said predetermined speed, said pilot valve element being connected to said servomotor and said differential piston to relay the movement of said servomotor and said differential piston back to said pilot valve element to move said pilot valve element relative to said sleeve to vary fluid pressure flow through said housing and said sleeve to move said differential piston and said control valve to a neutral position when said turbine resumes operation at approximately said predetermined speed, and means for limiting action of said servomotor including fluid flow controlling means operative to control the flow of fluid to said differential piston, and motion transmitting means connecting said servomotor to said flow controlling means for operating said controlling means to vary the flow of fluid to said differential piston to stop action of said servomotor in response to predetermined inlet valve means adjusting action of said servomotor.

4. In combination with a hydraulic turbine supplying power to a variable load at substantially constant predetermined speed, inlet valve means for controlling flow of water to said turbine, a fluid pressure operated servomotor movable to operate said turbine inlet valve means, a control valve for controlling admission of fluid pressure to said servomotor, a cylinder, a fluid pressure operated differential piston within said cylinder, said differential piston dividing said cylinder into two sections, said piston being connected to said control valve to operate said control valve, a source of fluid under pressure, one section of said cylinder connected to said source of fluid, a governor comprising a cylindrical housing having an inlet port connected to said source of fluid and having an outlet port connected to the other section of said cylinder, a cylindrical sleeve having an outer surface engaging an inner surface of said housing, said sleeve having at least a pair of openings for hydraulically connecting said inlet port to said outlet port through the bore of said sleeve, a pilot valve element within said sleeve, and means connected to said sleeve responsive to rotation of said turbine to rotate said sleeve about said pilot valve element and to move said sleeve axially relative to said housing and said pilot valve element to vary the flow of pressure fluid passing from said inlet port to said outlet port through said pair of openings and the bore of said sleeve under the control of said pilot valve element in response to turbine speed greater than and less than said predetermined speed to vary fluid pressure flow to said differential piston to move said differential piston and said control valve to admit fluid pressure to said servomotor to adjust said turbine inlet valve means to restore turbine speed to said predetermined speed, said pilot valve element being connected to said servomotor and said differential piston to relay the movement of said servomotor and said differential piston back to said pilot valve element to move said pilot valve element relative to said sleeve to vary fluid pressure flow through said housing and said sleeve to move said differential piston and said control valve to a neutral position when said turbine resumes operation at approximately said predetermined speed, and means for limiting action of said servomotor including fluid flow throttling means operative to throttle the flow of fluid to said differential piston, and motion transmitting means connecting said servomotor to said throttling means for operating said throttling means to throttle the flow of fluid to said differential piston to stop action of said servomotor in response to predetermined inlet valve means adjusting action of said servomotor.

5. In combination with a hydraulic turbine supplying power to a variable load at substantially constant predetermined speed, inlet valve means for controlling flow of water to said turbine, a fluid pressure operated servomotor movable to operate said turbine inlet valve means, a control valve for controlling admission of fluid pressure to said servomotor, a cylinder, a fluid pressure operated differential piston within said cylinder, said differential piston dividing said cylinder into sections, said piston being connected to said control valve to operate said control valve, a source of fluid under pressure, one section of said cylinder connected to said source of fluid, a governor comprising a cylindrical housing having an inlet port connected to said source of fluid and having an outlet port connected to the other section of said cylinder, a cylindrical sleeve having an outer surface engaging an inner surface of said housing, said sleeve having at least a pair of openings for hydraulically connecting said inlet port to said outlet port through the bore of said sleeve, a pilot valve element within said sleeve, and means connected to said sleeve responsive to rotation of said turbine to rotate said sleeve about said pilot valve element and to move said sleeve axially relative to said housing and said pilot valve element to vary the flow of pressure fluid passing from said inlet port to said outlet port through said pair of openings and the bore of said sleeve under the control of said pilot valve element in response to turbine speed greater than and less than said predetermined speed to vary fluid pressure flow to said differential piston to move said differential piston and said control valve to admit fluid pressure to said servomotor to adjust said turbine inlet valve means to restore turbine speed to said predetermined speed, said pilot valve element being connected to said servomotor and said differential piston to relay the movement of said servomotor and said differential piston back to said pilot valve element to move said pilot valve element relative to said sleeve to vary fluid pressure flow through said housing and said sleeve to move said differential piston and said control valve to a neutral position when said turbine resumes operation at approximately said predetermined speed, and means for limiting action of said servomotor including a throttle valve operative to throttle the flow of fluid to said differential piston, and an adjustable linkage connecting said servomotor to said throttle valve for operating said throttle valve to throttle the flow of fluid to said differential piston to stop action of said servomotor in response to predetermined inlet valve means adjusting action of said servomotor.

6. In combination with a hydraulic turbine supplying power to a variable load at substantially constant predetermined speed, inlet valve means for controlling flow of water to said turbine, a fluid pressure operated servomotor movable to operate said turbine inlet valve means, a control valve for controlling admission of fluid pressure to said servomotor, a cylinder, a fluid pressure operated differential piston within said cylinder, said differential piston dividing said cylinder into two sections, said piston being connected to said control valve to operate said control valve, a source of fluid under pressure, one section of said cylinder connected to said source of fluid, a governor comprising a cylindrical housing having an inlet port connected to said source of fluid and having an outlet port connected to the other section of said cylinder, a cylindrical sleeve having an outer surface engaging an inner surface of said housing, said sleeve having at least a pair of openings for hydraulically connecting said inlet port to said outlet port through the bore of said sleeve, a pilot valve element within said sleeve, and means connected to said sleeve responsive to rotation of said turbine to rotate said sleeve about said pilot valve element and to move said sleeve axially relative to said housing and said pilot valve element to vary the flow of pressure fluid passing from said inlet port to said outlet port through said pair of openings and the bore of said sleeve under the control of said pilot valve element in response to turbine speed greater than and less than said predetermined speed to vary fluid pressure flow to said differential piston to move said differential piston and said control valve to admit fluid pressure to said servomotor to adjust said turbine inlet valve means to restore turbine speed to said predetermined speed, said pilot valve element being connected to said servomotor by a first relay means and said pilot valve element being connected to said differential piston by a second relay means including a first lever, said first and second relay means relaying movement of said servomotor and said differential piston back to said pilot valve element to move said pilot valve element relative to said sleeve to vary fluid pressure flow through said housing and said sleeve to move said differential piston and said control valve to a neutral position when said turbine resumes operation at approximately said predetermined speed, and means for limiting action of said servomotor comprising a throttle valve operative to control the flow of fluid to said differential piston, a second lever pivotally connected to said first lever, said second lever being connected to said throttle valve, and motion transmitting means connecting said servomotor to said second lever to pivot said second lever relative to said first lever and adjust said throttle valve to vary the flow of fluid to said differential piston to stop action of said servomotor in response to predetermined inlet valve means adjusting action of said servomotor.

7. In combination with a hydraulic turbine supplying power to a variable load at substantially constant predetermined speed, inlet valve means for controlling flow of water to said turbine, a fluid pressure operated servomotor movable to operate said turbine inlet valve means, a control valve for controlling admission of fluid pressure to said servomotor, a cylinder, a fluid pressure operated differential piston within said cylinder, said differential piston dividing said cylinder into sections, said piston being connected to said control valve to operate said control valve, a source of fluid under pressure, one section of said cylinder connected to said source of fluid, a governor comprising a cylindrical housing having an inlet port connected to said source of fluid and having an outlet port connected to the other section of said cylinder, a cylindrical sleeve having an outer surface engaging an inner surface of said housing, said sleeve having at least a pair of openings for hydraulically connecting said inlet port to said outlet port through the bore of said sleeve, a pilot valve element within said sleeve, and means connected to said sleeve responsive to rotation of said turbine to rotate said sleeve about said pilot valve element and to move said sleeve axially relative to said housing and said pilot valve element to vary the flow of pressure fluid passing from said inlet port to said outlet port through said pair of openings and the bore of said sleeve under the control of said pilot valve element in response to turbine speed greater than and less than said predetermined speed to vary fluid pressure flow to said differential piston to move said differential piston and said control valve to admit fluid pressure to said servomotor to adjust said turbine inlet valve means to restore turbine speed to said predetermined speed, said pilot valve element being connected to said servomotor by a first relay means and said pilot valve element being connected to said differential piston by a second relay means including a first lever connected on one end to said differential piston and movable about a fixed point, said first and second relay means relaying movement of said servomotor and said differential piston back to said pilot valve element to move said pilot valve element relative to said sleeve to vary fluid pressure flow through said housing and said sleeve to move said differential piston and said control valve to a neutral position when said turbine resumes operation at approximately said predetermined speed, and means for limiting inlet valve adjusting action of said servomotor comprising a throttle valve operative to throttle the flow of fluid to said differential piston, a second lever pivotally connected at a midpoint thereof to said first lever, said second lever being connected on one end to said throttle valve, and motion transmitting means including an adjustable linkage connecting said servomotor to the end of said second lever remote from said throttle valve to pivot said second lever relative to said first lever and adjust said throttle valve to throttle the flow of fluid to said differential piston to stop action of said servomotor in response to predetermined inlet valve means adjusting action of said servomotor.

8. In combination with a hydraulic turbine supplying power to a variable load at substantially constant predetermined speed, inlet valve means for controlling flow of water to said turbine, a fluid pressure operated servomotor movable to operate said turbine inlet valve means, a control valve for controlling admission of fluid pressure to said servomotor, a cylinder, a fluid pressure operated differential piston within said cylinder, said differential piston dividing said cylinder into two sections, said piston being connected to said control valve to operate said control valve, a source of fluid under pressure, one section of said cylinder connected to said source of fluid, a governor comprising a cylindrical housing having an inlet port connected to said source of fluid and having an outlet port connected to the other section of said cylinder, a first cylindrical sleeve having an outer surface engaging an inner surface of said housing, a second cylindrical sleeve within the bore of said first sleeve, said sleeves each having at least a pair of openings for hydraulically connecting said inlet port to said outlet port through the bore of said second sleeve, a pilot valve element within said second sleeve; and means connected to said first sleeve responsive to rotation of said turbine to rotate said first and second sleeves about said pilot valve element and to move said first sleeve axially relative to said housing, said second sleeve, and said pilot valve element, to vary the flow of pressure fluid passing from said inlet port to said outlet port through said pair of openings in each of said sleeves, and the bore of said second sleeve under the control of said pilot valve element in response to turbine speed greater than and less than said predetermined speed to vary fluid pressure flow to said differential piston to move said differential piston and said control valve to admit fluid pressure to said servomotor to adjust said turbine inlet valve means to restore turbine speed to said predetermined speed; said pilot valve element being connected to said servomotor and said differential piston to relay the movement of said servomotor and said differential piston back to said pilot valve element to move said pilot valve element relative to said sleeves to vary fluid pressure flow through said housing and said sleeves to move said differential piston and said control valve to a neutral position when said turbine resumes operation at approximately said predetermined speed, and means for limiting action of said servomotor including motion transmitting means connected to said servomotor for moving said second cylindrical sleeve axially relative to said first cylindrical sleeve to vary the flow of fluid to said differential piston to stop action of said servomotor in response to predetermined inlet valve means adjusting action of said servomotor.

9. In combination with a hydraulic turbine supplying power to a variable load at substantially constant predetermined speed, inlet valve means for controlling flow of water to said turbine, a fluid pressure operated servomotor movable to operate said turbine inlet valve means, a control valve for controlling admission of fluid pressure to said servomotor, a cylinder, a fluid pressure operated differential piston within said cylinder, said differential piston dividing said cylinder into two sections, said piston being connected to said control valve to operate said control valve, a source of fluid under pressure, one section of said cylinder connected to said source of fluid, a governor comprising a cylindrical housing having an inlet port connected to said source of fluid and having an outlet port connected to the other section of said cylinder, a first cylindrical sleeve having an outer surface engaging an inner surface of said housing, a second cylindrical sleeve within the bore of said first sleeve and having a collar projecting radially outward beyond said first sleeve, a spring around both said first and second sleeves disposed axially between said collar of said second sleeve and said governor housing for resiliently supporting said second sleeve relative to said first sleeve and said governor housing, said second sleeve being keyed to said first sleeve for axial movement only relative to said first sleeve, said sleeves each having at least a pair of openings for hydraulically connecting said inlet port to said outlet port through the bore of said second sleeve, a pilot valve element within said second sleeve; and means connected to said first sleeve responsive to rotation of said turbine to rotate said first and second sleeves about said pilot valve element and to move said first sleeve axially relative to said housing, said second sleeve, and said pilot valve element, to vary the flow of pressure fluid passing from said inlet port to said outlet port through said pair of openings in each said sleeves and the bore of said second sleeve under the control of said pilot valve element in response to turbine speed greater than and less than said predetermined speed to vary fluid pressure to flow to said differential piston to move said differential piston and said control valve to admit fluid pressure to said servomotor to adjust said turbine inlet valve means to restore turbine speed to said predetermined speed; said pilot valve element being connected to said servomotor and said differential piston to relay the movement of said servomotor and said differential piston back to said pilot valve element to move said pilot valve element relative to said sleeves to vary fluid pressure flow through said housing and said sleeves to move said differential piston and said control valve to a neutral position when said turbine resumes operation at approximately said predetermined speed, and means for limiting action of said servomotor including a leverage connected to said servomotor for moving said second cylinder axially relative to said first cylindrical sleeve against the bias of said spring to vary the flow of fluid to said differential piston to stop action of said servomotor in response to predetermined inlet valve means adjusting action of said servomotor.

References Cited in the file of this patent

UNITED STATES PATENTS 2,153,381    Maas _____ Apr. 4, 1939

FOREIGN PATENTS 503,903    Germany _____ July 28, 1930